(12) United States Patent
Nishida

(10) Patent No.: US 10,035,315 B2
(45) Date of Patent: Jul. 31, 2018

(54) BEAD-UNIT ASSEMBLY DEVICE

(71) Applicants: FUJI SEIKO CO., LTD., Hashima-shi, Gifu-ken (JP); FUJI SHOJI CO., LTD., Hashima-shi, Gifu-Ken (JP)

(72) Inventor: Kihachiro Nishida, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 138 days.

(21) Appl. No.: 15/119,024

(22) PCT Filed: Feb. 28, 2014

(86) PCT No.: PCT/JP2014/055022
§ 371 (c)(1),
(2) Date: Aug. 15, 2016

(87) PCT Pub. No.: WO2015/129019
PCT Pub. Date: Sep. 3, 2015

(65) Prior Publication Data
US 2016/0361884 A1    Dec. 15, 2016

(51) Int. Cl.
*B29D 30/28* (2006.01)
*B29D 30/32* (2006.01)
(Continued)

(52) U.S. Cl.
CPC ............ *B29D 30/48* (2013.01); *B29D 30/26* (2013.01); *B29D 30/28* (2013.01); *B29D 30/32* (2013.01);
(Continued)

(58) Field of Classification Search
CPC ........ B29D 2030/481; B29D 2030/482; B29D 30/3021; B29D 30/3028; B29D 30/14;
(Continued)

(56) References Cited

U.S. PATENT DOCUMENTS 3,787,263 A * 1/1974 Yonekawa ............ B29D 30/50
                                                           156/136
4,219,375 A   8/1980 Vandale et al.
(Continued)

FOREIGN PATENT DOCUMENTS

JP    47-018240 B2   5/1972
JP    S48-99272 A    12/1973
(Continued)

OTHER PUBLICATIONS

International Search Report for Application No. PCT/JP2014/055022 dated Apr. 8 2014.
(Continued)

*Primary Examiner* — William P Bell
(74) *Attorney, Agent, or Firm* — Tarolli, Sundheim, Covell & Tummino LLP

(57) ABSTRACT

A press-up member presses a movable member upward, thus raising a pressing member. A support block is moved forward by means of the press-up member and a moved member. Due to the cam action brought about by such movement, the pressing member is arranged above a filler on a balloon of a molding drum. Then, the press-up member is lowered to press a distal end section of the filler onto the balloon. In this state, the molding drum is rotated to mold the filler in an annular shape. The pressing member is then separated from the filler and the pressing member is arranged at a standby position outside the molding drum. The press-up member and the moved member are separable from each other and, in the separated state, the molding drum is independently rotatable.

6 Claims, 9 Drawing Sheets

(51) Int. Cl.
    *B29D 30/48*   (2006.01)
    *B29D 30/26*   (2006.01)
(52) U.S. Cl.
    CPC ............ *B29D 2030/2685* (2013.01); *B29D 2030/3285* (2013.01); *B29D 2030/482* (2013.01)
(58) Field of Classification Search
    CPC ............ B29D 30/18; B29D 30/28; B29D 2030/2685; B29D 2030/3207; B29D 2030/3285; B29D 2030/487
    See application file for complete search history.

(56) References Cited

U.S. PATENT DOCUMENTS

| | | | |
|---|---|---|---|
| 4,229,246 | A | 10/1980 | Vanderzee |
| 4,410,389 | A | 10/1983 | Cole et al. |
| 5,080,738 | A | 1/1992 | Araki et al. |
| 2011/0155300 | A1 | 6/2011 | Takagi |
| 2011/0297298 | A1 | 12/2011 | Marchini et al. |
| 2015/0083307 | A1* | 3/2015 | Slot .................. B29D 30/48 156/135 |
| 2015/0360429 | A1* | 12/2015 | Nishida .............. B29D 30/48 156/136 |

FOREIGN PATENT DOCUMENTS

| | | |
|---|---|---|
| JP | H02-062232 A | 3/1990 |
| JP | H06-099518 A | 4/1994 |
| JP | H06-316003 A | 11/1994 |
| JP | 2002-361757 A | 12/2002 |
| JP | 2005153145 A | 6/2005 |
| WO | 2010/047161 A1 | 4/2010 |

OTHER PUBLICATIONS

Office Action for corresponding Japanese Application No. 2016-504962, dated Nov. 14, 2017, with English translation.
International Preliminary Report on Patentability for Application No. PCT/JP2014/055022 dated Sep. 6, 2016.
Office Action for corresponding Philippine Patent Application No. 1-2016-501398 dated Apr. 16, 2018.

* cited by examiner

BEAD-UNIT ASSEMBLY DEVICE

TECHNICAL FIELD

The present invention relates to a bead-unit assembly device for assembling a bead core and a filler with each other.

BACKGROUND ART

Typically, a bead unit configured by a bead core and a filler is embedded in a bead portion of a tire. The bead unit is configured by integrating the bead core and the filler with each other before embedding the bead unit in the tire (see, for example, Patent Document 1).

PRIOR ART DOCUMENTS

Patent Document

Patent Document 1: Japanese Laid-Open Patent Publication No. 2002-361757

SUMMARY OF THE INVENTION

Problems that the Invention is to Solve

However, to ensure efficient assembly of the bead core and the filler using a simple configuration, improvement of the conventional technique is needed.

Accordingly, it is an objective of the present invention to ensure efficient assembly of a bead core and a filler using a simple configuration.

Means for Solving the Problem

To achieve the above-described objective, provided is a bead-unit assembly device comprising a molding drum, a pressing member supported by the molding drum, the pressing member being movable between a position close to a peripheral surface of the molding drum and a position spaced from the peripheral surface, the pressing member being capable of pressing a filler on the peripheral surface of the molding drum when located at the close position, a moved member movable integrally with the pressing member, and an actuating member that can be moved by an actuator between a position spaced from the moved member and a position at which the actuating member contacts the moved member and thus move the pressing member, together with the moved member, in a direction away from the molding drum.

In this configuration, it is unnecessary to arrange an actuator for moving the pressing member to a pressing position or a standby position, such as an air cylinder, at the side corresponding to the molding drum. This also makes it unnecessary to arrange a pipe or the like with a complicated configuration between the molding drum and the exterior of the molding drum. As a result, the configuration of the molding device becomes simplified and assembly of a bead unit by the molding drum is facilitated.

Effect of the Invention

According to the present invention, a bead unit having a bead core and a filler is assembled easily using a simple device.

MODE FOR CARRYING OUT THE INVENTION

An embodiment of a bead-unit assembly device will now be described.

Figure 1:
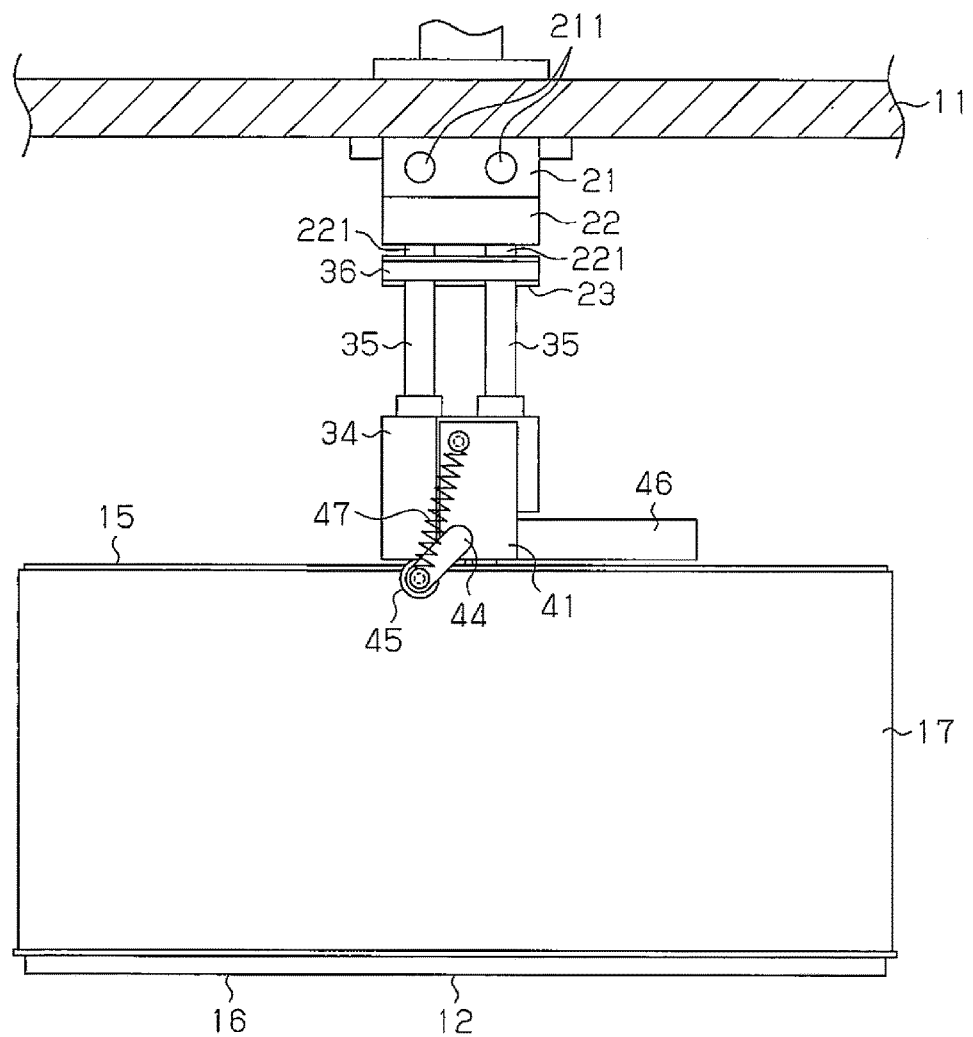
FIG. 1 is a partially cutaway plan view showing a bead-unit assembly device.
Figure 2:
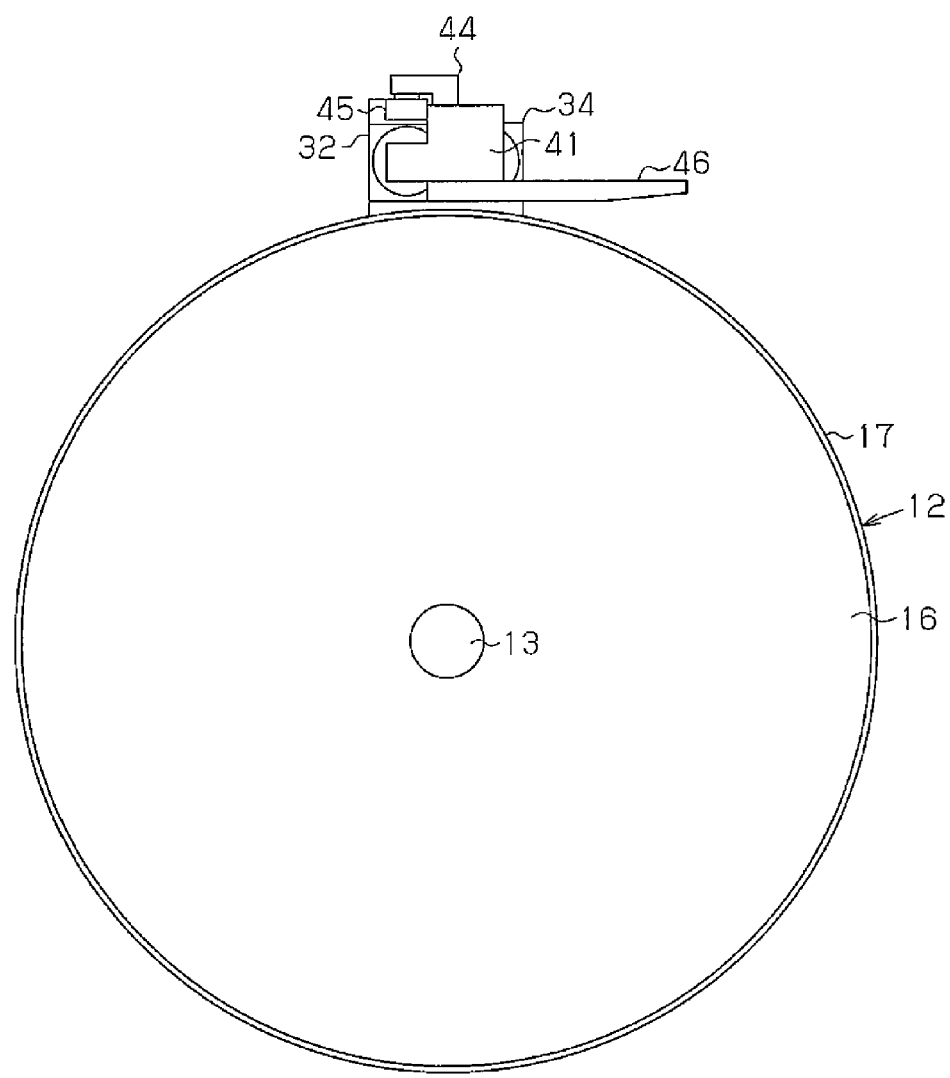
FIG. 2 is a front view showing the bead-unit assembly device.
Figure 3:
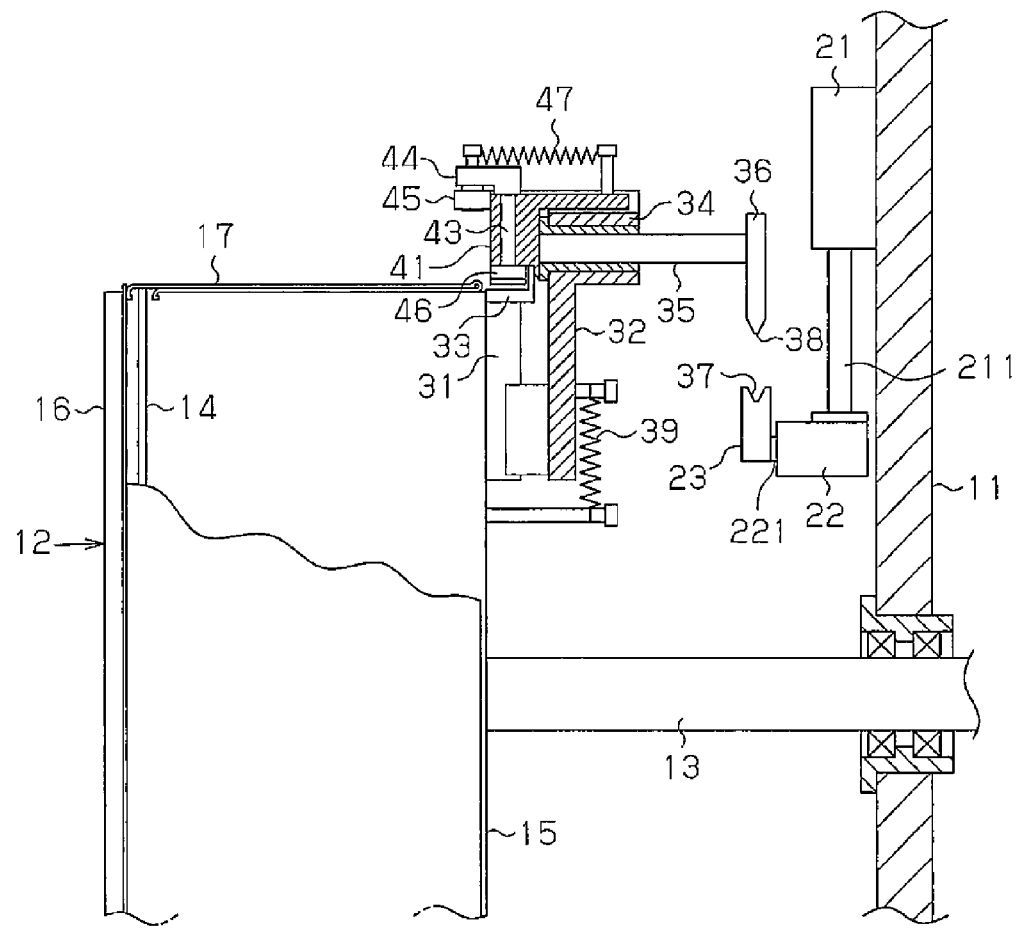
FIG. 3 is a partially cutaway side view showing a state of a molding drum without a filler on it.

As illustrated in FIGS. 1 to 3, a molding drum 12 is supported by a frame 11 in a manner rotatable about a horizontal drum shaft 13. In the molding drum 12, a first attachment portion 15, which has a comparatively great width, and a second attachment portion 16, which has a comparatively small width, are arranged adjacent to each other in the axial direction. The second attachment portion 16 can be selectively extended and compressed about the drum shaft 13. A peripheral section of a balloon 17, which has an annular shape as a whole, is secured to an end section of the first attachment portion 15 at the side corresponding to the second attachment portion 16 in an airtight manner. The second attachment portion 16 has a slit 14 for supplying air into the balloon 17. The form of the balloon 17 is switched between a flat state in which the balloon 17 is folded in half on an outer peripheral surface of the first attachment portion 15 of the molding drum 12 and an inflated state in which the balloon 17 contains air.

With reference to FIG. 3, an upper air cylinder 21 is fixed to the frame 11 at a position spaced rearward from the molding drum 12. Piston rods 211 of the upper air cylinder 21 extend downward. Hereinafter, the left side as viewed in FIG. 3 is defined as a front section. A lower air cylinder 22 is fixed to the distal ends of the piston rods 211. Piston rods 221 of the lower air cylinder 22 extend forward toward the molding drum 12. A press-up member 23 serving as an actuating member is fixed to the distal ends of the piston rods 221 of the lower air cylinder 22.

Figure 5:
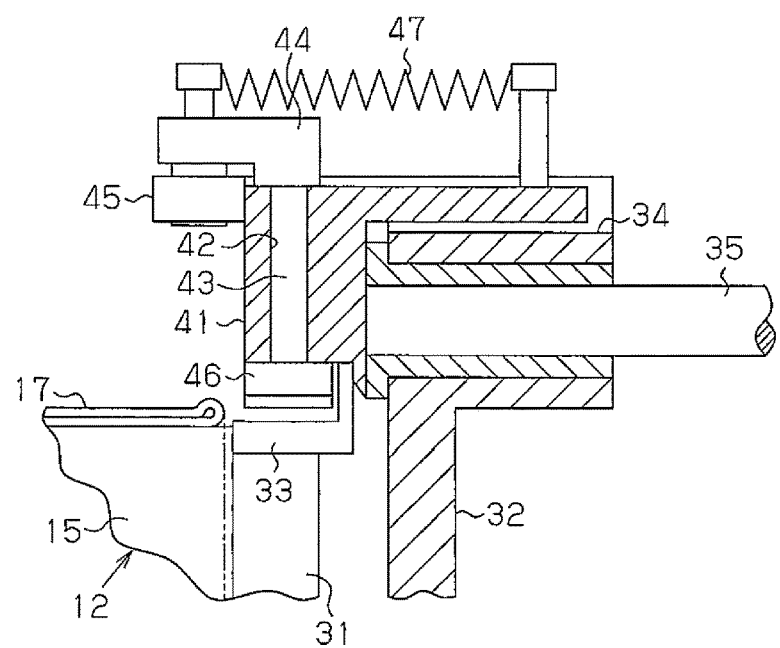
FIG. 5 is an enlarged cross-sectional view showing the cam roller and a pressing member.

As shown in FIGS. 3 and 5, a guide rail 31, which extends in a radial direction of the molding drum 12, is fixed to the back surface of the molding drum 12. A movable member 32 is supported by the guide rail 31 in a manner movable in the radial direction of the molding drum 12. The movable member 32 is urged toward the axis of the molding drum 12 by a spring 39 serving as an urging member. The movement limit of the movable member 32 at the side corresponding to the axis of the molding drum 12 is restricted by a stopper 33.

Figure 4:
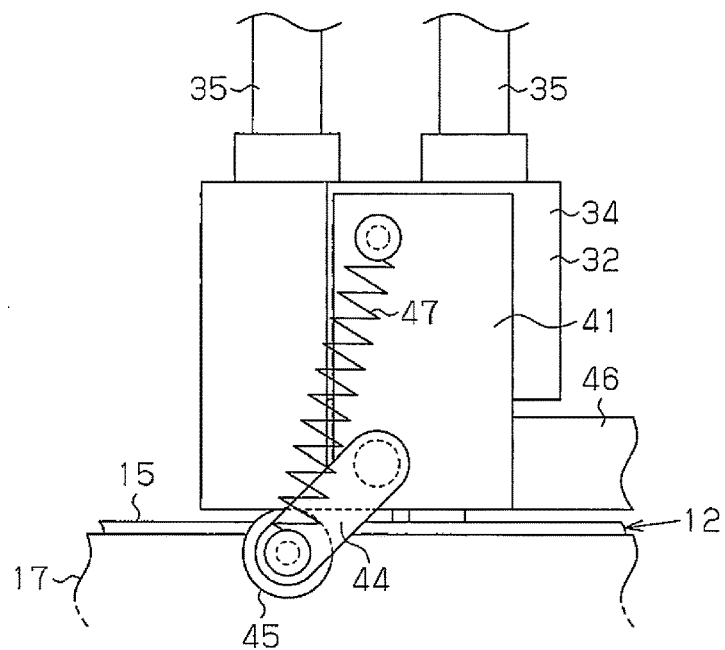
FIG. 4 is an enlarged plan view showing a peripheral mechanism of a cam roller.

Referring to FIGS. 4 and 5, a tubular guide portion 34 is formed in an upper end section of the movable member 32. Support rods 35 are supported by the tubular guide portion 34 in a manner movable in a front-and-rear direction. A moved member 36 is fixed to the rear ends of the support rods 35. The press-up member 23 is capable of contacting and separating from the moved member 36 in correspondence with actuation of the upper and lower air cylinders 21 and 22. A recess 37 is formed in one of the press-up member 23 and the moved member 36. A projection 38, which is engageable with the recess 37, is formed in the other one of the press-up member 23 and the moved member 36. When the press-up member 23 and the moved member 36 are in contact with each other, the contact state is maintained by engagement between the recess 37 and the projection 38.

A support block 41 is fixed to the front ends of the support rods 35. A support hole 42, which extends in a radial direction of the molding drum 12, is formed in the support block 41. A support shaft 43 is rotatably supported by the support hole 42. A lever 44 is fixed to the distal end of the support shaft 43. A cam roller 45 is rotatably supported by a distal end section of the lever 44. The cam roller 45 is moved between a front surface of the tubular guide portion 34 and a side surface of the support block 41. This restricts the pivot range of the lever 44 to the range between the first position shown in FIG. 4 and the second position shown in FIG. 8, which corresponds to 90 degrees. A spring 57 urges the cam roller 45 to contact the front surface of the tubular guide portion 34 and the side surface of the support block 41.

With reference to FIGS. 3 and 5, a pressing member 46 is fixed to the basal end of the support shaft 43. As the lever 44 and the support shaft 43 rotate, the pressing member 46 is arranged at a position at a side corresponding to the molding drum 12 and a position outside the molding drum 12 selectively.

Operation of the bead-unit assembly device will hereafter be described.

FIGS. 1 to 5 each illustrate an initial state of a bead-unit assembly step.

In this state, the molding drum 12 is stopped and various components above the molding drum 12, such as the movable member 32, are arranged each at an upper position.

Further, in the state, the piston rods 211 of the upper air cylinder 21 are projected downward and the piston rods 221 of the lower air cylinder 22 are retracted rearward. The press-up member 23 is thus arranged at a standby position, which is located downward and rearward. The movable member 32 is located at a lower position at which the movable member 32 is restricted by the stopper 33 due to the urging force of the spring 39. Meanwhile, the support block 41 is arranged at a rear position and the moved member 36 faces the press-up member 23 from above.

Also in this state, the urging force of the spring 39 causes the cam roller 45 to contact the front surface of the tubular guide portion 34. The lever 44 is thus arranged at the first position. As a result, the pressing member 46 is arranged at the standby position, which is outside the molding drum 12. The balloon 17 is in the flat state, or folded in half, on the molding drum 12.

Figure 6:
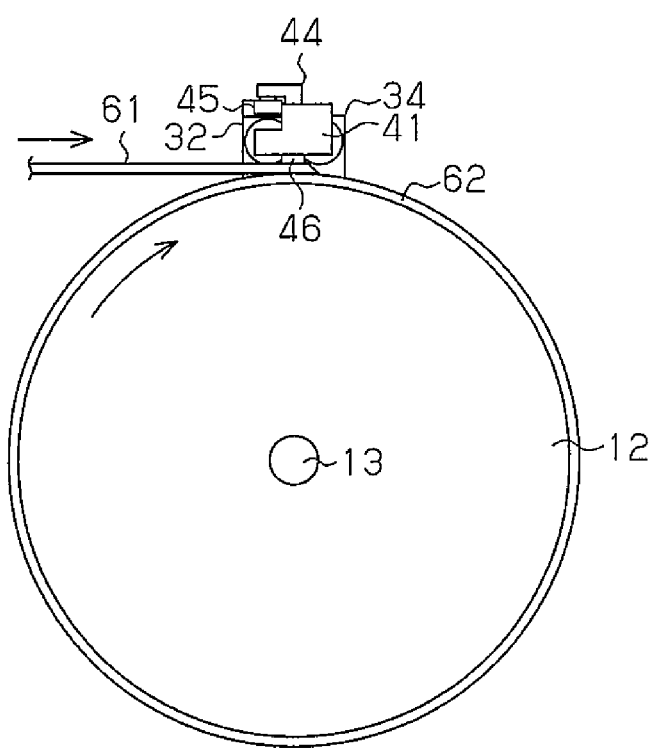
FIG. 6 is a front view showing an initial stage of a winding cycle of the filler.

As illustrated in FIG. 6, in this state, the distal end of a filler 61 is introduced onto the balloon 17 on the outer periphery of the molding drum 12, which is stopped. Also, referring to FIG. 7, an annular bead core 62 is attached to the outer periphery of the second attachment portion 16, which is in a compressed state, of the molding drum 12. Afterwards, the second attachment portion 16 is switched to an extended state to hold the bead core 62 from the side corresponding to the inner periphery of the bead core 62.

Subsequently, the piston rods 211 of the upper air cylinder 21 are retracted to raise the press-up member 23. This causes the press-up member 23 to contact the moved member 36 from below. Then, as illustrated in FIG. 7, as the press-up member 23 is raised, the movable member 32 is pressed upward against the urging force of the spring 39.

Figure 7:
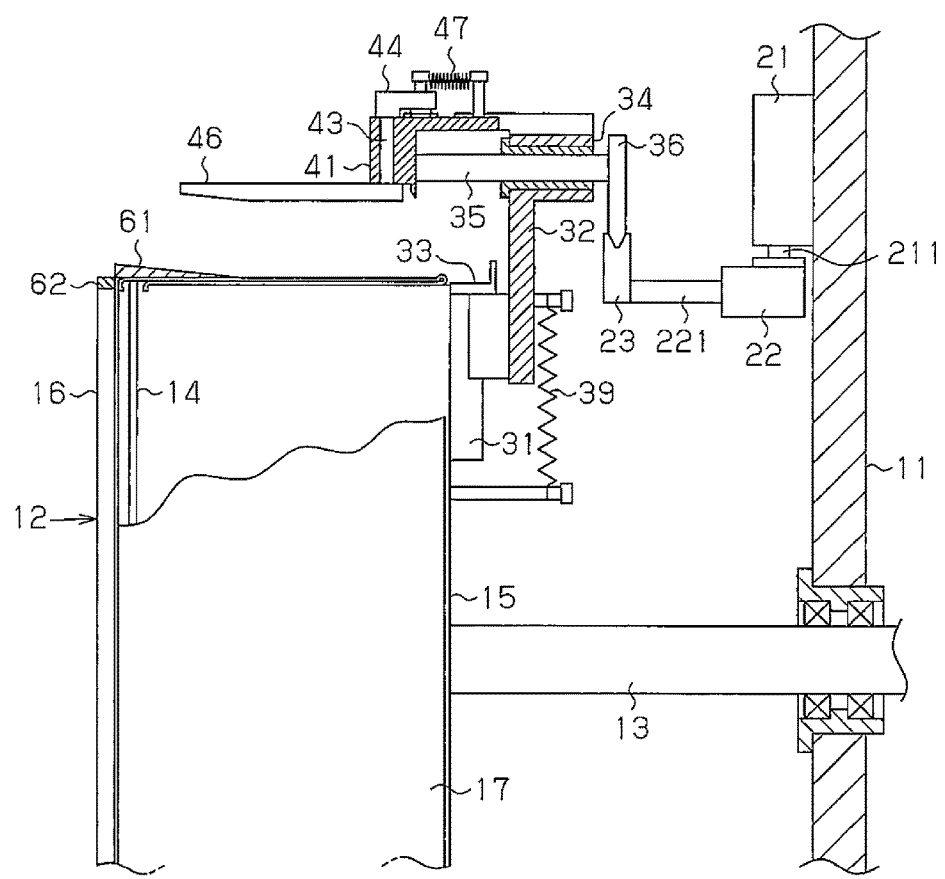
FIG. 7 is a partially cutaway side view showing a state of the molding drum with the filler on it.

Next, with reference to FIG. 7, the piston rods 221 of the lower air cylinder 22 are projected. This moves the support block 41 forward by means of the press-up member 23 and the moved member 36. As a result, as is clear from FIG. 8, the urging force of the spring 39 causes the cam roller 45 to roll on the front surface of the movable member 32 and then move onto the side surface of the support block 41. The lever 44 is thus rotated by 90 degrees. Correspondingly, the pressing member 46 is rotated by 90 degrees at a front position. The pressing member 46 is thus located above a distal end section of the filler 61 on the balloon 17.

Figure 9:
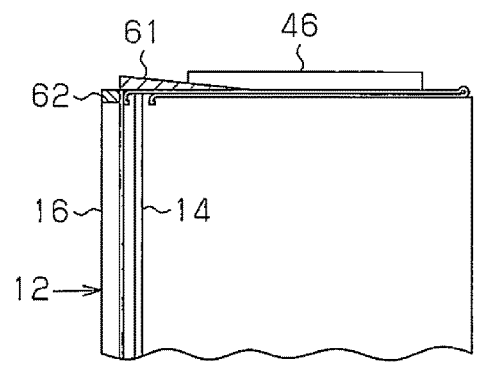
FIG. 9 is a partial cross-sectional view showing the pressed state of the filler.

Afterwards, the piston rods 211 of the upper air cylinder 21 are projected downward to lower the press-up member 23. This lowers the movable member 32 due to the weight of the movable member 32 and the urging force of the spring 39. As a result, as shown in FIG. 9, the pressing member 46 is also lowered. The pressing member 46 thus presses the distal end section of the filler 61 onto the balloon 17.

Figure 8:
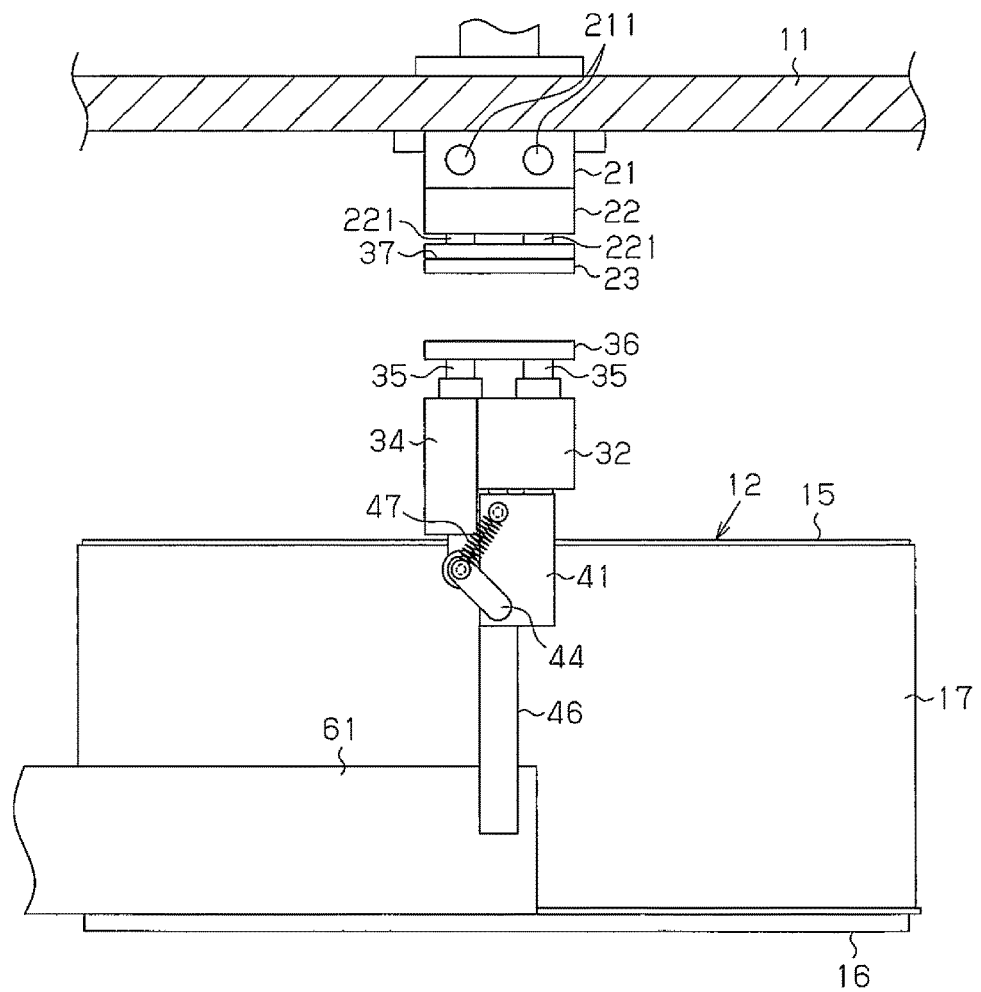
FIG. 8 is a partially cutaway plan view showing a pressed state of the filler at the initial stage of the winding cycle of the filler.

The piston rods 211 of the upper air cylinder 21 are continuously projected downward. This releases the press-up member 23 from the moved member 36, thus separating the press-up member 23 and the moved member 36 from each other. As a result, in this state, the mechanism at the side corresponding to the molding drum 12 is disengaged from the mechanism at the side corresponding to the cylinders 21, 22. The molding drum 12 is thus switched to a rotatable state. Then, as illustrated in FIG. 8, the piston rods 221 of the lower air cylinder 22 are retracted rearward and the press-up member 23 is arranged at the standby position.

Figure 10:
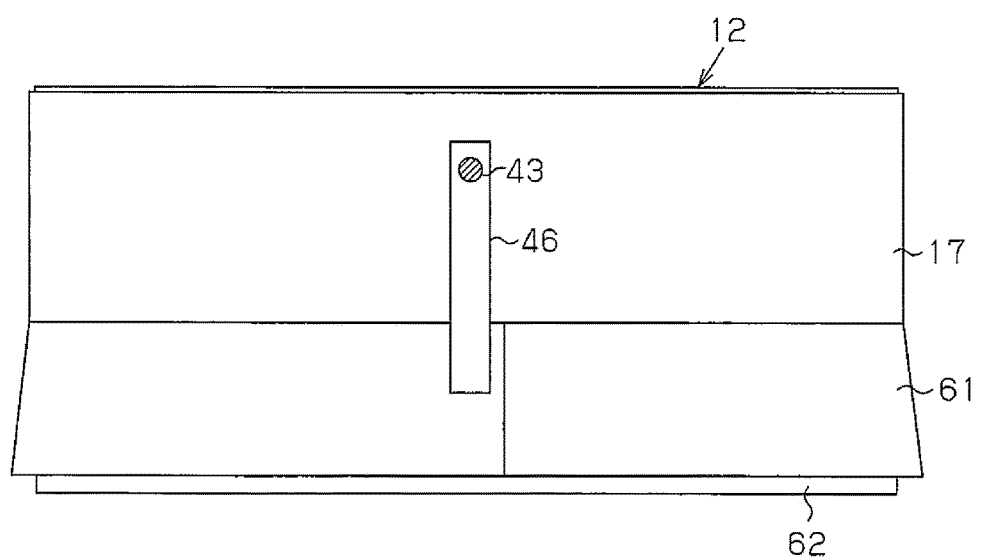
FIG. 10 is a plan view showing a stage at which the winding cycle of the filler is completed.

In this state, the molding drum 12 starts to rotate. The molding drum 12 is then rotated by one cycle, integrally with the movable member 32. Meanwhile, the filler 61 is supplied onto the balloon 17 of the molding drum 12. The filler 61 is then cut at a position spaced from the distal end of the filler 61 by a predetermined distance. Then, as illustrated in FIG. 10, the opposite ends of the filler 61 are crimped to each other to mold the filler 61 in an annular shape.

Afterwards, the piston rods 211 of the upper air cylinder 21 are retracted and the lower air cylinder 22 is projected forward. This raises the support block 41 through contact between the press-up member 23 and the moved member 36. The pressing member 46 thus separates upward from the filler 61. Subsequently, the lower air cylinder 22 is retracted rearward to cause the support rods 35 to retreat. Also, the urging force of the spring 47 and the cam action of the cam roller 45 rotate the lever 44 by 90 degrees. The pressing member 46 is thus arranged at the standby position, which is outside the molding drum 12.

Then, the piston rods 211 of the upper air cylinder 21 are projected downward and the lower cylinder 22 is retracted rearward. This separates the press-up member 23 from the moved member 36, thus moving the press-up member 23 to the standby position, which is located rearward. As a result, the movable member 32 and the like are arranged at the lower limit positions restricted by the stopper 33, as shown in FIG. 1, due to the weights of the movable member 32 and the like and the urging force of the spring 39.

Figure 11:
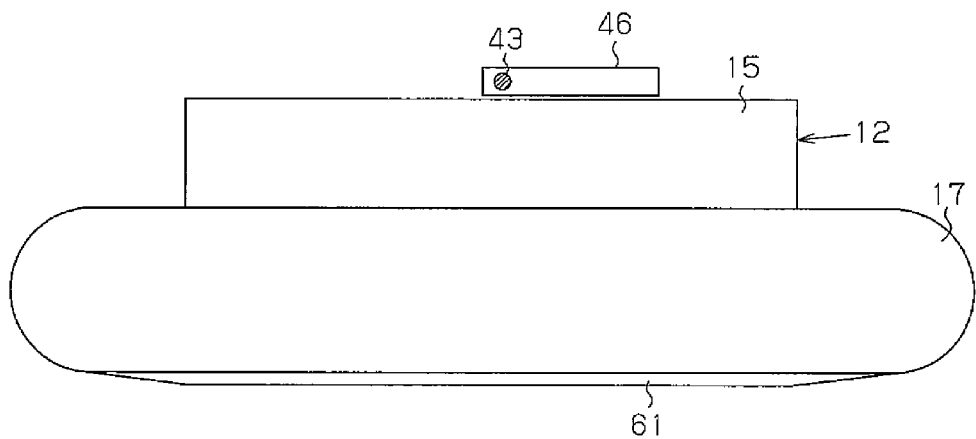
FIG. 11 is a plan view showing an inflated state of a balloon.
Figure 12:
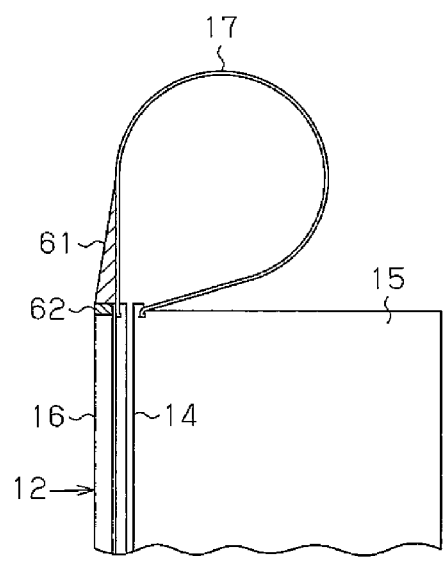
FIG. 12 is a partial cross-sectional view showing the inflated state of the balloon.

Subsequently, as illustrated in FIGS. 11 and 12, the balloon 17 is inflated to raise the filler 61 upright on the bead core 62. A bead unit is thus assembled.

Finally, the second attachment portion 16 of the molding drum 12 is compressed and the unit of the bead core 62 and the filler 61 is removed from the molding drum 12. The unit is then sent to a subsequent step of manufacturing a tire.

Accordingly, the present embodiment has the advantages described below.

It is unnecessary to arrange an actuator for moving the pressing member 46 to the pressing position or the standby position, such as an air cylinder, at the side corresponding to the molding drum 12. This also makes it unnecessary to connect a pipe for the air cylinder to the molding drum 12, which rotates, or arrange a joint with a complicated configuration that permits rotation of the molding drum 12. This not only simplifies the configuration of the molding device but also facilitates assembly of a bead unit using the molding drum 12.

Since a drive mechanism for moving the pressing member 46 above the molding drum 12 is unnecessary, the molding drum 12 is reduced in weight. This decreases the power for rotating the molding drum 12, thus effectively saving energy.

Movement of the pressing member 46 between the pressing position and the standby position is performed using cam action. This simplifies the configuration.

The present embodiment may be modified as described below.

As a drive member for moving the press-up member 23, a motor and a screw mechanism rotated by the motor may be employed instead of the air cylinders.

The lower air cylinder 22 may be omitted. In this case, a configuration in which the press-up member 23 simply moves below the moved member 36 in the axial direction of the molding drum 12 is employed.

DESCRIPTION OF THE REFERENCE NUMERALS

12 . . . Molding Drum, 17 . . . Balloon, 21 . . . Upper Air Cylinder, 22 . . . Lower Air Cylinder, 23 . . . Press-Up Member, 32 . . . Movable Member, 36 . . . Moved Member, 39 . . . Spring, 44 . . . Lever, 45 . . . Cam Roller, 46 . . . Pressing Member, 61 . . . Filler, 62 . . . Bead Core.

The invention claimed is:

1. A bead-unit assembly device comprising:
a molding drum;
a pressing member supported by the molding drum, the pressing member being movable between a position close to a peripheral surface of the molding drum and a position spaced from the peripheral surface, the pressing member being capable of pressing a filler on the peripheral surface of the molding drum when located at the close position;
a moved member movable integrally with the pressing member; and
an actuating member that can be moved by an actuator between a position spaced from the moved member and a position at which the actuating member contacts the moved member, the actuating member moving the pressing member, together with the moved member, in a direction away from the peripheral surface of the molding drum.

2. The bead-unit assembly device according to claim 1, wherein a balloon is mounted on an outer periphery of the molding drum, the filler being raised upright together with a bead core by inflating the balloon.

3. The bead-unit assembly device according to claim 1, wherein a movable member movable radially about the axis of the molding drum is supported by the molding drum, the pressing member being supported by the movable member.

4. The bead-unit assembly device according to claim 3, wherein an urging member for urging the movable member toward the side corresponding to the axis of the molding drum is arranged.

5. The bead-unit assembly device according to claim 3, wherein the pressing member is supported by the movable member in a manner movable between a position at which the pressing member faces the peripheral surface of the molding drum and a position at which the pressing member is retracted from the peripheral surface of the molding drum.

6. The bead-unit assembly device according to claim 5, wherein the pressing member is allowed to move between an operating position and a standby position using a cam action.

* * * * *